Oct. 22, 1929.  F. C. HUGHES  1,732,334
AUTOMOBILE SIGNAL
Filed Feb. 10, 1926  2 Sheets-Sheet 1
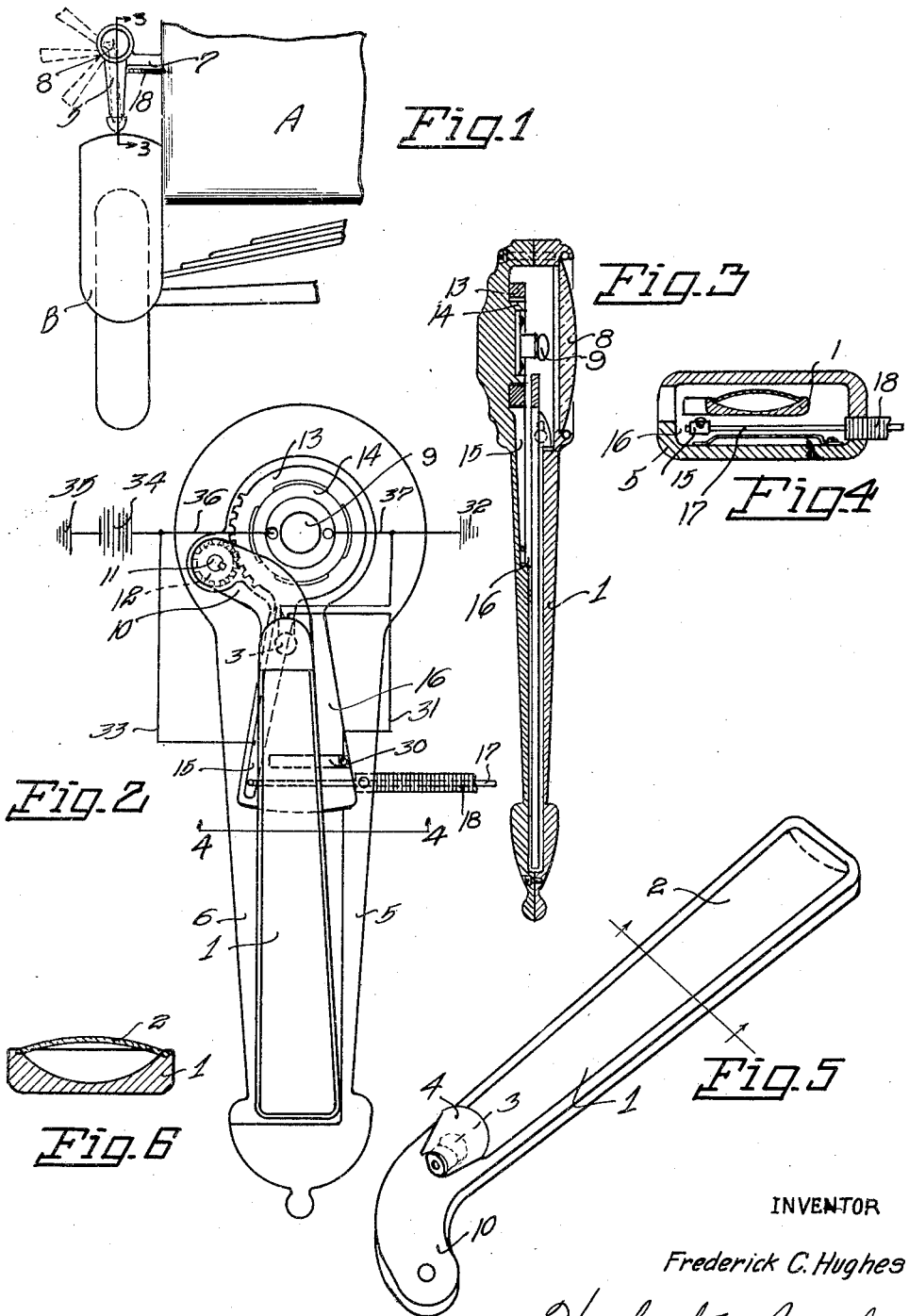
INVENTOR
Frederick C. Hughes
Herbert E. Smith
ATTORNEY Oct. 22, 1929.    F. C. HUGHES    1,732,334
AUTOMOBILE SIGNAL
Filed Feb. 10, 1926    2 Sheets-Sheet 2
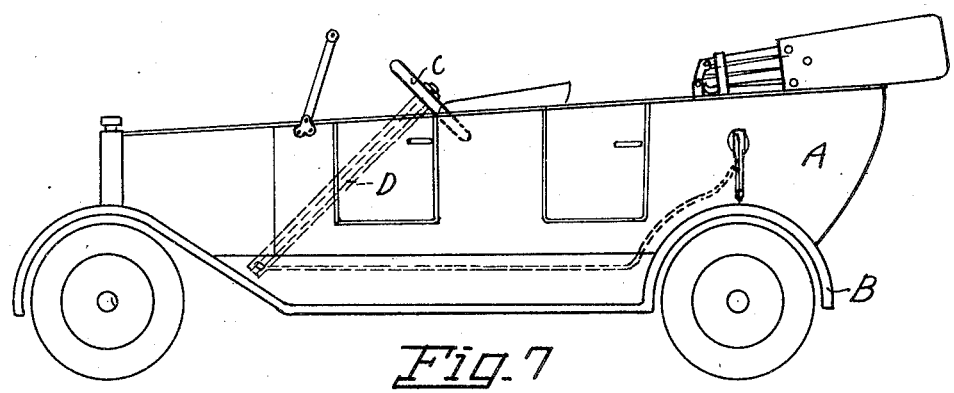
Fig. 7
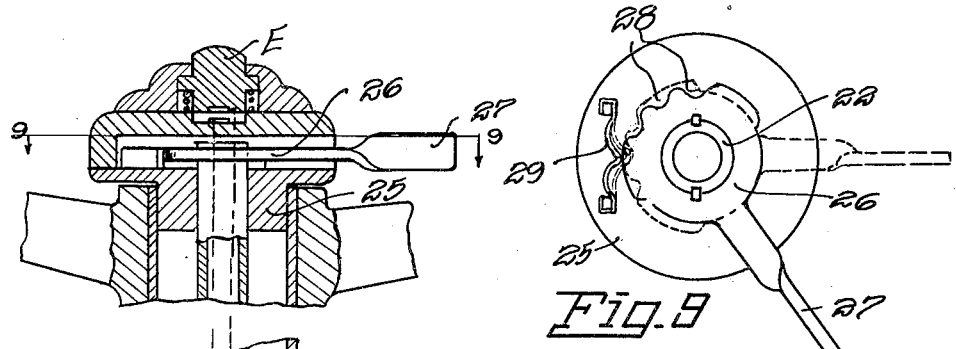
Fig. 8     Fig. 9
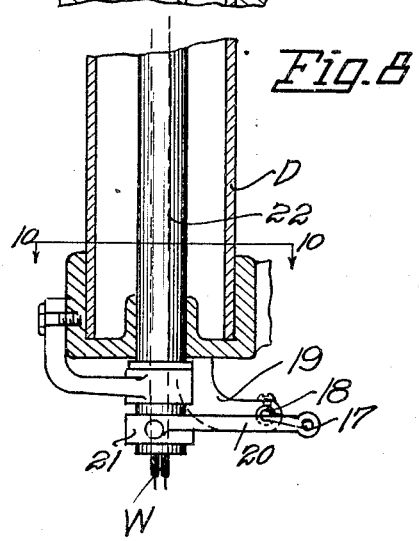
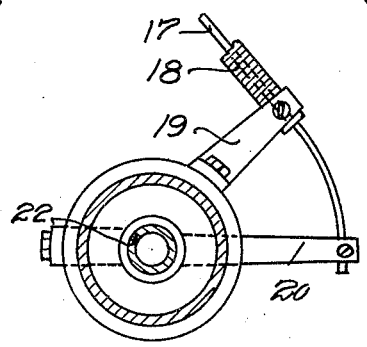
Fig. 10
Inventor
Frederick C. Hughes
By Herbert E. Smith
Attorney Patented Oct. 22, 1929

1,732,334

UNITED STATES PATENT OFFICE

FREDERICK C. HUGHES, OF SPOKANE, WASHINGTON

AUTOMOBILE SIGNAL

Application filed February 10, 1926. Serial No. 87,359.

My present invention relates to improvements in automobile signals of the type carried by a vehicle and adapted to display an illuminated semaphore or pivoted signal arm in a selected one of three positions to indicate a left turn, a right turn, and the intention of the driver of the vehicle to bring the latter to a stop.

The signal device is located at a convenient position on the vehicle, as at the rear on the left wheel guard, and is manually controlled by suitable connections and devices, the latter preferably located on the steering wheel post in convenient position for use by the driver.

Electrical connections are provided for automatically illuminating the signal arm when it is displayed in operative position, and means in connection with the electric lamp are also provided for illuminating the usual tail light of the vehicle.

The invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a rear view of a portion of an automobile illustrating the location of the signal device, and by dotted lines showing the three selective positions of the semaphore or signal arm, which is normally enclosed within a casing or housing.

Figure 2 is an enlarged diagrammatic view in elevation of the signal arm and its casing, with the electrical connections for the lamp.

Figure 3 is a vertical sectional view of the device or attachment, as at line 3—3 of Figure 1.

Figure 4 is an enlarged transverse sectional view through the hollow arm and its casing at line 4—4 of Figure 2.

Figure 5 is a perspective detail view of the signal arm detached.

Figure 6 is a transverse sectional view of the hollow signal arm at line 6—6 of Figure 5.

Figure 7 is a side view of an automobile equipped with the signal device supported on its rear left wheel guard, and showing by dotted lines the operative connections to the steering post of the vehicle.

Figure 8 is a vertical sectional view showing the steering wheel-post and the manually operated control device for the signal arm supported thereby.

Figure 9 is a top plan view at line 9—9 of Figure 8 showing the control or operating lever for the signal arm.

Figure 10 is a sectional detail view at line 10—10 of Figure 8.

In order that the general relation and assembly of parts may readily be understood I have indicated in Figures 1 and 7 a standard type of automobile as A with the rear, left wheel guard B, the steering wheel C and steering post D, together with the usual horn button E. As illustrated the signal device is preferably attached to the left rear wheel guard B and located on top thereof.

The signal device includes a semaphore or arm 1 which is of suitable length, and hollow and provided with a transparent face 2 of glass or similar material. Near its pivoted end the arm is provided with an electric lamp 3 and an enclosing reflector 4 which is located in such position as to direct the light rays longitudinally in the hollow arm and illumine the transparent face of the arm throughout its length, when the arm is moved to or displayed in operative position as indicated by the three dotted line positions of Figure 1.

The arm is normally enclosed in a vertically arranged casing 5 having a side or edge opening 6 and supported by means of a suitable bracket 7 from the body of the car.

At its upper end the casing is fashioned with a red lens 8, back of which, within the casing is provided a lamp 9 for use as the tail or rear light of the automobile.

The arm is pivotally supported in the casing and for this purpose is fashioned with a curved, perforated head 10 by means of which the arm is rigidly secured on a stud shaft or pivot pin 11, which shaft also has fixed thereto a pinion 12. The pinion, its shaft and the arm are oscillated through the action of a gear ring 13 journaled on a circular bearing 14 of the casing and engaging the pinion. The gear ring is provided with a crank arm 15 preferably integral therewith and movable in a wide groove or recess 16 provided therefor in the wall of the casing.

To the free end of the crank arm a wire 17 is attached, said wire being encased within a flexible, tubular shield or housing 18 which extends toward the front of the vehicle as indicated in Figure 7 by dotted lines. At its front end the tubular shield is attached to a bracket 19 and the wire 17 passes out of the shield and is attached to a lever arm 20, which is affixed as by means of its collar 21 to the tubular shaft 22. This shaft is located within the hollow steering post D and passes through its lower closed end 23. Beneath the closed end of the post a bracket 24 is provided as a bearing for the rotary shaft 22, and it will be apparent that as the shaft is turned in its bearing, the motion is transmitted to the wire 17 for the purpose of manipulating the signal arm, to a selected one of its three dotted positions in Figure 1.

The shaft 22 also has a bearing in the head 25 of the steering post, which head is made hollow for the accommodation of a circular head 26 fixed on the shaft 22 and provided with an operating lever 27 extending outside the steering post head and located in position where it is accessible for use by the driver for operating the signal arm.

For holding the circular head in adjusted position I employ a series of notches 28 in its edge which co-act with a spring or resilient detent 29 fixed in the hollow steering-post head, as indicated by dotted lines and full lines in Figure 9.

Preferably there are four notches provided in the circular head for co-action with the spring or resilient detent to hold the lever and the signal arm in normal position, with the arm in its casing, and the three successive notches co-act with the resilient detent to hold the displayed arm in one of the three dotted positions, as stop, right turn, and left turn in Figure 1.

The electric lamp 3 is illumined when the signal arm is swung to its first dotted (or stop) position, and remains illumined in that position, or remains illumined when turned to either of the two successive positions. The lamp of course is extinguished when the arm is returned to its casing or housing.

The illumination of the lamp is accomplished by using the crank arm 15 as the movable contact point of an electrical switch which co-acts with a stationary contact plate 30 fixed in the casing and in the path of movement of the arm so that the latter may frictionally engage with it, when the crank arm is pulled to operate the signal arm.

The circuit for the signal lamp, which is shown open in Figure 2 includes the wire 31 from the conductor plate or contact plate 30 to the ground at 32, and connection 33 from the crank arm 15 to the battery 34 which is grounded at 35. The tail light circuit for lamp 9 includes the wires 36 and 37 to the battery 34 and ground, and of course is provided with the necessary control switch.

The signal device and its operating parts may with facility be attached to and adapted for use with standard types of automobiles. The operating parts of the signal device for controlling the signal arm carried by the steering post may be applied to the post without material changes therein, as is indicated by the illustration of the steering wheel C and its post in Figure 8 together with the arrangement of the wires W of the signal horn which pass up through the hollow shaft 22 to the switch or button E carried on the head of the steering post.

Having thus fully described my invention what I claim as new and desire to secure by Letters Patent is:

In a signal device a slotted casing having an interior pivot post, a pivot shaft in the casing, a pinion and a signal arm fixed to revolve with the shaft, a lamp mounted centrally of the post and a lens in the casing in front of the lamp, a gear ring pivoted concentrically of the post and engaging the pinion, a crank arm on the gear ring, and means for actuating the crank arm.

In testimony whereof I affix my signature.

FREDERICK C. HUGHES.